(12) United States Patent
Bolduan

(10) Patent No.: US 6,752,925 B2
(45) Date of Patent: Jun. 22, 2004

(54) FILTER DEVICE WITH AN ELECTRICALLY GROUNDED CERAMIC MEMBRANE FILTER ELEMENT

(75) Inventor: Peter Bolduan, Ladbergen (DE)

(73) Assignee: Atech Innovations GmbH, Gladbeck (DE)

( * ) Notice: Subject to any disclaimer, the term of this patent is extended or adjusted under 35 U.S.C. 154(b) by 491 days.

(21) Appl. No.: 09/823,778

(22) Filed: Mar. 30, 2001

(65) Prior Publication Data

US 2001/0027944 A1 Oct. 11, 2001

(30) Foreign Application Priority Data

Mar. 31, 2000 (DE) .......................................... 100 16 006

(51) Int. Cl.[7] .............................................. B01D 61/18
(52) U.S. Cl. .................... 210/243; 204/665; 210/323.2; 210/435; 210/497.01; 210/500.25; 210/500.26
(58) Field of Search ................................ 204/554, 660, 204/665; 210/243, 323.2, 435, 497.01, 500.25, 500.26, 748

(56) References Cited

U.S. PATENT DOCUMENTS

| | | | |
|---|---|---|---|
| 4,153,545 A | | 5/1979 | Zwack et al. |
| 4,326,960 A | * | 4/1982 | Iwahori et al. ............. 210/650 |
| 4,849,104 A | | 7/1989 | Garcera et al. |

FOREIGN PATENT DOCUMENTS

| | | |
|---|---|---|
| DE | 30 30 097 | 3/1981 |
| DE | 43 08 380 | 9/1983 |
| DE | 35 19 620 | 1/1986 |
| DE | 41 34 223 | 11/1992 |
| DE | 42 23 181 | 1/1994 |
| DE | 44 24 719 | 2/1995 |
| DE | 694 00 874 T2 | 3/1997 |
| DE | 299 05 464 | 7/1999 |
| DE | 199 31 261 | 1/2001 |
| JP | 59 173106 | 10/1984 |
| JP | 59 199 003 | 11/1984 |
| JP | 63 302906 | 12/1988 |
| JP | 64-90004 | 4/1989 |
| WO | WO99/15260 | 4/1999 |
| WO | WO 99/15262 | 4/1999 |

OTHER PUBLICATIONS

Synthetic Membranes: Science, Engineering and Applications, D. Reidel Publ. Co., Dordrecht, Holland 1986.
Elektrizitaetslehre, Robert Wichard Pohl, Springer–Verlag, Berlin, 1967.
Grimsehls Lehrbuch der Physik, B.G. Teubner, Peipzig, 1938
Lexikon der Physik, Franck'sche Verlagshandlung, Stuttgart, 1969.

* cited by examiner

Primary Examiner—Roy King
Assistant Examiner—William T. Leader
(74) Attorney, Agent, or Firm—Collard & Roe, P.C.

(57) ABSTRACT

A filter device (1) is provided for microfiltration and/or ultrafiltration, preferably for varnishes, such as cathodic dipping varnishes, for connection to a conduit, having a pressure housing (2) and at least one ceramic membrane filter element (3) located in the pressure housing (2). In order to make a filter device of the previously mentioned type available which is also suitable for the recycling of varnishes, particularly cathodic dipping varnishes, the ceramic membrane filter element (3) is electrically connected with at least one electrical conductor (5) and is grounded via the electrical conductor (5).

11 Claims, 3 Drawing Sheets

FILTER DEVICE WITH AN ELECTRICALLY GROUNDED CERAMIC MEMBRANE FILTER ELEMENT

CROSS REFERENCE TO RELATED APPLICATIONS

Applicant claims priority under 35 U.S.C. §119 of German Application No. 100 16 006.9 filed on Mar. 31, 2000.

BACKGROUND OF THE INVENTION

1. Field of the Invention

The invention concerns a filter device to be connected to a conduit for microfiltration and/or ultrafiltration, preferably for varnishes, such as cathodic dipping varnishes, having a pressure housing and at least one ceramic membrane filter element located in the pressure housing. The present invention further concerns a process for microfiltration and/or ultrafiltration of fluids to be filtered using at least one filter device of the type previously described.

2. The Prior Art

In practice, filter devices for microfiltration and ultrafiltration of the type initially mentioned are used in many areas. Areas of use are, for example, the filtration of waste water, cleaning solutions, cooling lubricants as from drilling emulsions, and cell separations in high load biology, the concentration of brick engobes, the cleaning of pickling baths, as well as the recycling of swimming pool water. Filter devices of the type initially mentioned are also used in the chemical and biochemical industries for cell separation, protein filtration, dye filtration, catalyst reclamation, and purification of photochemical developing solutions. Furthermore, these types of filter devices are also used in the food industry, for example, in the filtration of sediment from beer, in the clarifying filtration of sugar syrup, fruit juice, wine, and vinegar, in the defatting of whey, and in lactoferrin filtration.

Filter devices of the type initially mentioned are not typically used in the area of varnish recycling, particularly of cathodic dipping varnishes which are used in the varnishing of motor vehicle parts. This is because it has become known that ceramic membrane filter elements clog relatively quickly, so that economical recycling of varnish with filter devices of the type under discussion is currently not possible. For these reasons, filter devices with polymer filters are typically currently used for the recycling of cathodic dipping varnishes.

However, it is problematic that polymer filters have a comparatively low operational capacity when used for the recycling of cathodic dipping varnishes. Due to the comparatively low operational capacity, very large filter areas are required to be able to process large amounts of fluids to be filtered and/or recycled, which, in turn, requires a relatively large amount of space for a polymer filter facility. A further disadvantage of polymer filter devices when used for cathodic dipping varnish recycling is that the polymer filter elements have a comparatively short service life of between half a year and a year. The polymer filter elements must subsequently be replaced, which requires a corresponding expenditure of work. Furthermore, when polymer filter elements are used in the way described, the polymer filters must be cleaned after shutting down the filter installation for operational reasons, in order to achieve the desired filtration capacity when the installation is started up again. These types of cleanings require increased expenditure of work and time, which is disadvantageous in regard to costs. If cleanings are not performed frequently enough or cleaning is unintentionally forgotten, the function of the entire installation can be significantly impaired.

SUMMARY OF THE INVENTION

An object of the current invention is therefore to provide a filter device of the type initially mentioned which is also suitable for the recycling of varnishes, particularly cathodic dipping varnishes.

The previously described object is essentially achieved, according to the invention, by a filter device of the type mentioned initially, in that a ceramic membrane filter element is electrically connected with at least one electrical conductor and is grounded via the electrical conductor. According to the method, it is provided that the fluid to be filtered is at least partially discharged before and/or during the filtration.

Surprisingly, it has been determined that, in the application of the invention, it is possible to recycle cathodic dipping varnishes economically with ceramic membrane filter elements without anything further being necessary. Other fluids having a charged state during filtration can also henceforth be filtered and/or recycled. The result according to the invention was surprising because the previous impression was that filter devices were, in practice, always grounded in any case. However, it has been determined using precise tests that, due to the nonconducting seals and buffers used, the pressure housings of the individual filter devices do not have sufficient grounding in and of themselves. Even with sufficient grounding of the pressure housing alone, the effect according to the invention could not be detected to the same degree occurring when the individual ceramic membrane filter elements are grounded. It is inferred from this that the effect according to the invention, namely the conductance of charges via the grounding, must occur directly at the location at which the filtration also occurs, namely at the ceramic membrane filter element itself. Furthermore, it is inferred from this that conductance of charges possibly present on the membrane surface of the ceramic membrane filter element itself also occurs due to the implementation according to the invention. In any case, the conductance of charges through the grounding of the ceramic membrane filter element keeps the individual molecules and/or ions of the fluid to be filtered from accumulating on the surface of the ceramic membrane filter elements and clogging the filter element in this way.

The advantages achievable with the invention are, in any case, convincing. Due to the significantly higher operational capacity, filter devices with ceramic membrane filter elements, which require significantly less space for the same operational capacity, can now also be used where previously only polymer filters could be used. Furthermore, it has been determined that the invention makes it possible, without anything further, to lengthen the intervals between cleaning of the filter device according to the invention, and/or not perform any cleaning at all over a long period of time, without this having disadvantageous effects on the degree of effectiveness of the installation. In addition, when ceramic membrane filter elements of the type according to the invention are used, the installation can be immediately started up again after it is shut down, i.e. no stripping or cleaning must be performed, which also contributes to improvement of the operational and/or functional reliability of the installation.

In a structurally simple development according to the invention, the pressure housing and/or the conduit which is connected to the filter device consists of an electrically conductive material, while the ceramic membrane filter element is connected via the electrical conductor with the pressure housing and/or the conduit. The grounding then occurs via the pressure housing and/or the conduit. Basically, it is, of course, also possible to lead the conductor as such out of the pressure housing and ground it directly.

In a particularly simple development of the present invention, the conductor is formed as a component separate from the pressure housing, preferably a wire, which electrically connects the pressure housing and/or the conduit with the ceramic membrane filter element. The use of a wire represents a very simple and economical development of a conductor which can also be realized as a supplement to existing installations at low cost, without anything further being necessary.

Particularly good filtration results are realized in this respect if the conductor is inserted in a through hole of the ceramic membrane filter element and extends at least over essentially the entire length of the through hole. In this way, a conductance of charges over the entire length of the ceramic membrane filter element is possible. It is particularly favorable if the conductor is led completely through the through hole and is grounded on both ends, i.e. is electrically connected with the pressure housing and/or the conduit on both ends.

Pressure housings of the type under discussion typically have a central pressure housing part and a fitting on each end for connection to the conduit. It is advantageous in attaching the conductor to the pressure housing that the conductor be held between the respective fitting and the pressure housing part, in particular that it be clamped between them. Of course, it is also possible to hold the conductor between the pressure housing and the conduit at the appropriate connection point.

Ceramic membrane filter elements of the type under discussion can have one or a plurality of through openings depending on use. It has been determined that if a plurality of through openings are provided, it is sufficient for adequate conductance of charges when only one conductor is provided for the ceramic membrane filter element. This conductor is then favorably located in one of the middle through openings, particularly the central through opening, insofar as one is provided.

In order, on one hand, to achieve a secure attachment of the conductor to the ceramic membrane filter element, and, on the other hand, to ensure good conductance of the charges, the conductor is glued to the ceramic membrane filter element in the through opening via an electrically conductive adhesive. It has been shown to be particularly favorable in this respect that the electrically conductive adhesive extends over essentially the entire face of the ceramic membrane filter element. It is thereby ensured that the fluid flowing to the filter device has the possibility of charge conductance as soon as it meets the face of the ceramic membrane filter element. Furthermore, the arrangement of the adhesive layer also has a positive effect on the conductance of charges from the surface of the ceramic membrane filter element.

It is also practical in this respect that the electrically conductive adhesive extends into all of the through openings for a short distance (preferably a few centimeters), i.e. not only in the through opening in which the conductor is located, but also in all other through openings not having a conductor. This can be easily achieved in the manufacturing process by dipping the end of the ceramic membrane filter element into the electrically conductive adhesive.

Filter devices of the type under discussion can, in principle, have one or a plurality of ceramic membrane filter elements. If a plurality of ceramic membrane filter elements are provided, it is sufficient for each ceramic membrane filter element to only have one conductor. In their installed state, the individual conductors projecting out of the ceramic membrane filter elements are then preferably collected into one strand, and—as described above—grounded, or, however, a further conductor which is appropriately grounded is used, connecting together all the conductors.

In an alternative implementation of the present invention, it is provided that the ceramic membrane filter element is allocated to a device for generation of electrical field in order to achieve an electrical discharge or charging of the fluid to be filtered. In this alternative according to the invention, the conductance of charges to the outside via grounding does not occur, rather a charge equalization of the fluid to be filtered is intentionally performed.

The further positive results of the invention indicated above are achieved in the same way with this charge equalization.

Because the charge equalization must occur before or at least during the filtration in order to prevent accumulation of charged particles of the fluid to be filtered on the ceramic membrane filter element, the device for generation of electrical field is either effective within the pressure housing or is connected in series directly to the pressure housing.

In a particularly simple development of the embodiment previously mentioned, only one electrode is provided which serves as a sacrificial electrode. In another development, two electrodes are provided which are connected with an energy source wherein the strength of the electrical field is able to be adjusted via a corresponding adjustment device. This is then done according to the use and/or the type of fluid to be filtered.

BRIEF DESCRIPTION OF THE DRAWINGS

The invention is described in greater detail with reference to the drawings showing exemplary embodiments of the invention in which.

DETAILED DESCRIPTION OF PREFERRED EMBODIMENTS

Figure 1:
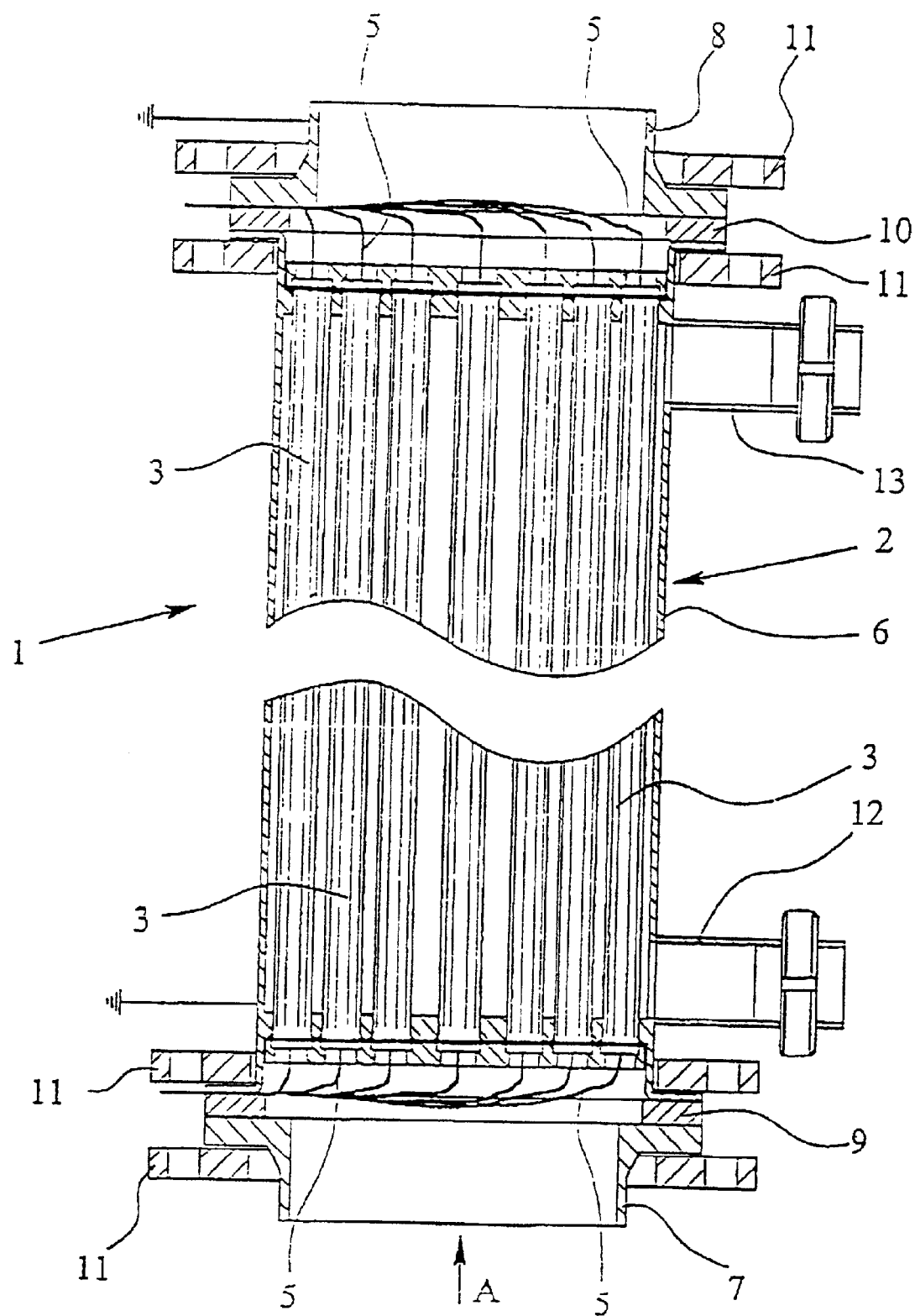
FIG. 1 shows a cross-sectional view of the filter device according to the invention.

In FIG. 1, a filter device 1 is illustrated which can be used, above all, for the microfiltration and/or ultrafiltration of fluids. The filter device 1 is particularly suitable for the filtration of varnishes, particularly cathodic dipping varnishes. For operation, the filter device 1 is connected at both ends to a conduit (not shown) supplying the fluid to be filtered. The filter device 1 has a pressure housing 2 and at least one ceramic membrane filter element 3 located in the pressure housing 2.

Figure 3:
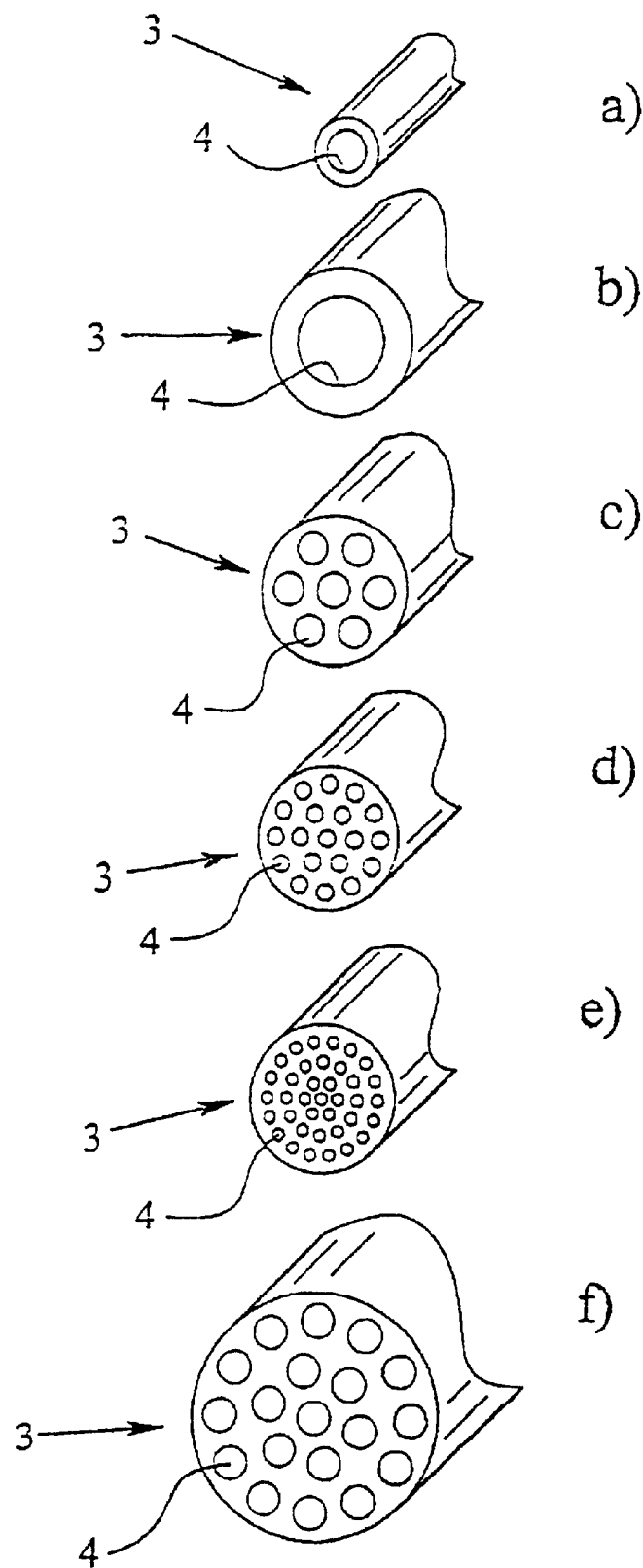
FIGS. 3a–3f various ceramic membrane filter elements which can be grounded by the method according to the invention.

In the illustrated exemplary embodiment, a plurality of ceramic membrane filter elements 3 are provided in the pressure housing 2. The individual ceramic membrane filter elements 3 each have a long and rod-like form and are each provided with at least one through opening 4. While only one through opening 4 is provided in the embodiments according to FIGS. 3a and 3b, several through openings 4 are provided in each of the embodiments according to FIGS. 3c to 3f.

Each of the ceramic membrane filter elements 3 has a carrier tube made from open-pored a-aluminum oxide or silicon carbide. The individual carrier tubes have a maximum permeability and fulfill high requirements for mechanical strength. A membrane film only a few $\mu$m thick with a defined texture is applied in several layers and monolithically bonded on the inner side of the channel of the carrier tubes which are manufactured as monochannel or multi-channel as depicted in FIGS. 3a to 3f. The material of the membrane film is α-aluminum oxide, SiC, ZrO2, or TiO2, depending on the usage. The average pore diameter of the membrane film for microfiltration is, as a rule, in the range $\geq$0.1 $\mu$m, and is typically $\leq$0.05 $\mu$m for ultrafiltration. Ceramic membrane filter elements 3 of the type previously mentioned are principally distinguished by high pressure resistance, resistance to concentrated alkaline solutions and acids, ability to be backwashed, resistance to abrasion, easy cleaning, temperature stability, ability to be steam sterilized, and high flux.

It is now essential that at least one ceramic membrane filter element 3 is electrically connected with at least one electrical conductor 5 and grounded via the electrical conductor 5. In the illustrated exemplary embodiment, the pressure housing 2 consists of an electrically conductive material wherein the ceramic membrane filter element 3 is electrically connected with the pressure housing 2 via the electrical conductor 5, and the pressure housing 2 is grounded. It is, of course, also possible in principle to lead the electrical conductor 5 completely out of the pressure housing 2 and ground it directly. It is also possible to connect the electrical conductor 5 with the conduit (not shown), insofar as the conduit also consists of electrically conductive material, and to ground the conduit.

In the present case, a component separate from the pressure housing 2, namely a wire, is used as the conductor 5 which electrically connects the pressure housing with the ceramic membrane filter element 3. As can be seen from FIG. 2, the conductor 5 is led completely through one of the through openings 4 of the ceramic membrane filter element 3 wherein the ends of the conductor 5 project out of the ends of the ceramic membrane filter element 3. The wire 5 is then directly or indirectly grounded on both of its ends.

The conductor 5 can be attached in various ways, for example by clamping, welding, or insertion, or by boring a hole through the pressure housing and inserting the conductor through it. The pressure housing 2 has, as can be seen in FIG. 1, a central pressure housing part 6 and a fitting 7, 8 at each end for connection to the conduit (not shown). A seal 9, 10 is provided between the central pressure housing part 6 and each of the two fittings 7, 8.

In the upper part of FIG. 1 on one hand and in the lower part of FIG. 1 on the other hand, two different possibilities for attachment of the wire and grounding of the pressure housing 2 are illustrated. In the upper part of FIG. 1, the conductor 5 is welded onto the electrically conductive fitting 8 wherein the fitting 8 is grounded. In the lower part of FIG. 1, in contrast, the wire is welded on to the central pressure housing part 6 wherein the central pressure housing part 6 is grounded. Additionally, flange rings 11, which are to be screwed on correspondingly in a way that is not shown, serve to attach each of the fittings 7, 8 with the central pressure housing part 6.

Figure 2:
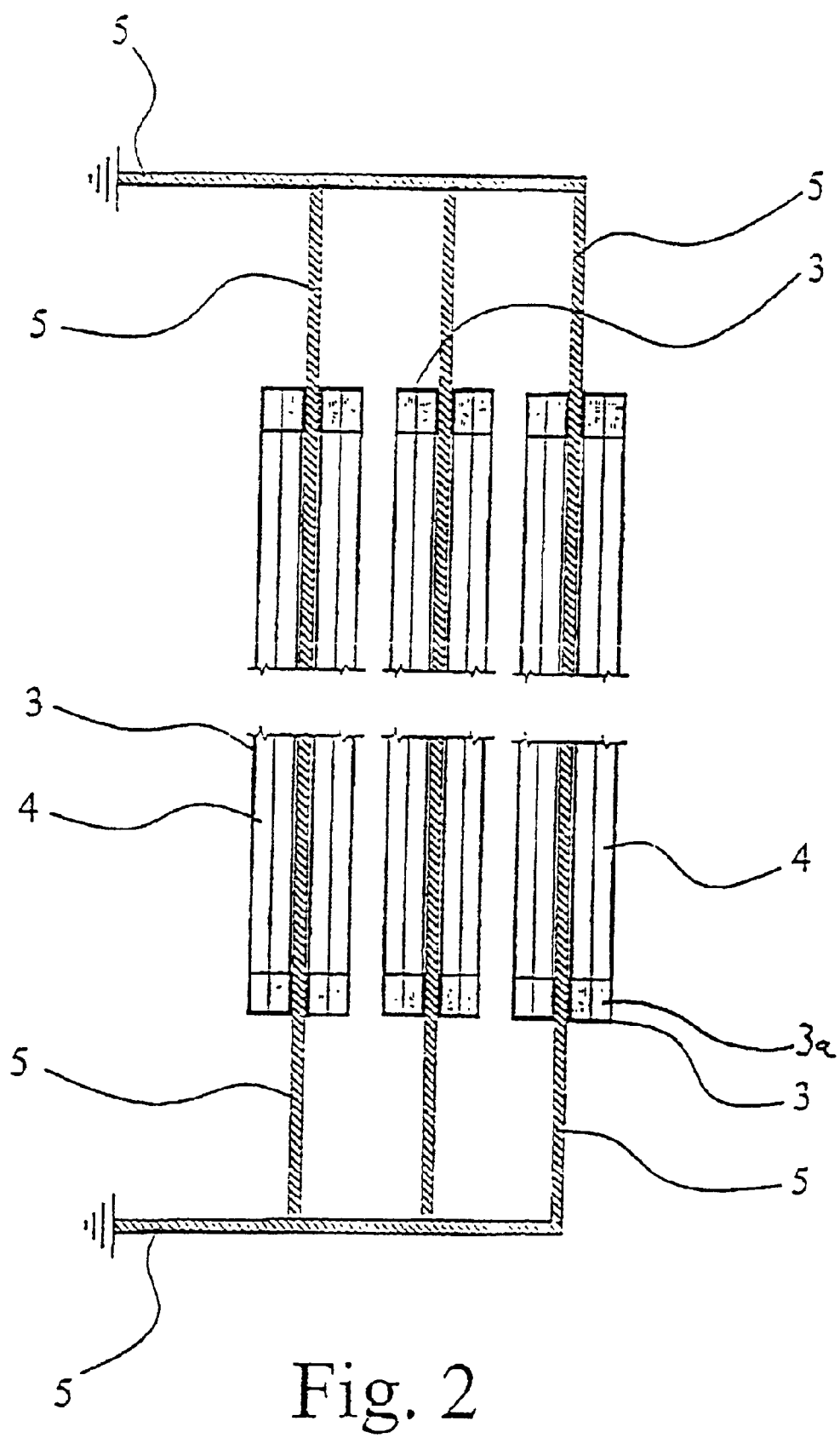
FIG. 2 shows a schematic view of ceramic membrane filter elements grounded by the method according to the invention.

As can be seen from FIG. 2, the provided ceramic membrane filter elements 3 which each have a plurality of through openings 4 are each only provided with one conductor 5 per ceramic membrane filter element 3. The conductor 5 is led through a through opening 4 in the middle region, preferably the central through opening 4. An adhesive attachment 3a on the ends of the ceramic membrane filter element 3 serves for attachment of the conductor 5. In the present case, this is an electrically conductive adhesive with which the conductor 5 is glued to the ceramic membrane filter element 3 in the appropriate through opening 4. Although it is not shown, the adhesive extends over essentially the entire face of the ceramic membrane filter element. In addition, the adhesive also reaches a short way, particularly a few centimeters, into the through openings 4, even into those in which there is no conductor 5. This is easily achieved during manufacturing by dipping the face of the ceramic membrane filter element 3 concerned into the adhesive.

Additionally, it is also shown in FIGS. 1 and 2 that in the use of several ceramic membrane filter elements 3 in one pressure housing 2, a number of conductors 5 are provided corresponding to the number of ceramic membrane filter elements 3 which can be collected into one strand or can be connected with an attached further conductor 5, which is then connected with the pressure housing 2 and the conduit, via which the grounding finally occurs.

The method of operation of the filter device 1 illustrated in FIG. 1 is such that the fluid to be filtered is supplied via the conduit (not shown) of the filter device 1, as is shown by the arrow A. The fluid flows through the through openings 4 and is thereby filtered via the ceramic membrane filter elements 3. The filtrate is then drawn off via the filtrate drain fittings 12, 13. It is understood that for this purpose, the filtrate drain fittings 12, 13 are connected with corresponding conduits, which are not shown. In an embodiment which is not shown, the filter device has a device for generation of an electrical field in order to achieve an electrical discharge or an electrical charging of the fluid to be filtered. This can be any kind of device with which an electrical field can be generated and/or a charge equalization can be produced in the fluid. This device is either a component of the pressure housing or is connected directly in series to the pressure housing. In a simple development, the device for generation of an electrical field only has one electrode, which is implemented as a sacrificial electrode. However, it is also possible in principle to provide two electrodes which are connected with an energy source, wherein an adjustment device for adjustment of the strength of the electrical field is provided.

Accordingly, while a few embodiments of the present invention have been shown and described, it is to be understood that many changes and modifications may be made thereunto without departing from the spirit and scope of the invention as defined in the appended claims.

What is claimed is:

1. A filter device for connection to a conduit, which comprises:
   (a) a pressure housing;
   (b) at least one ceramic membrane filter element located in the pressure housing; and
   (c) at least one electrical conductor electrically connected with and effecting grounding of the ceramic membrane filter element;
   wherein said at least one ceramic membrane filter has at least one through hole and said at least one conductor is inserted in the through hole.

2. A filter device according to claim 1 wherein:

(a) a member selected from the group consisting of the pressure housing and the conduit consists of an electrically conductive material;

(b) the ceramic membrane filter element is electrically connected with said member via the electrical conductor; and (c) said member is grounded.

3. A filter device according to claim 1 wherein the conductor comprises a component separate from the pressure housing, said component electrically connecting the pressure housing or the conduit with the ceramic membrane filter element.

4. A filter device according to claim 1 wherein the conductor extends along essentially the entire length of the through hole.

5. A filter device according to claim 4 wherein the conductor is electrically connected at each end with the pressure housing or the conduit.

6. A filter device according to claim 1 wherein the pressure housing has a central pressure housing part and a fitting at each end of said housing for connection to the conduit.

7. A filter device according to claim 1 wherein a plurality of ceramic membrane filter elements are provided in the pressure housing, each ceramic membrane filter element electrically connected with a respective one of a plurality of electrical conductors.

8. A filter device for connection to a conduit, which comprises:

(a) a pressure housing;

(b) at least one ceramic membrane filter element located in the pressure housing; and (c) at least one electrical conductor electrically connected with and effecting grounding of the ceramic membrane filter element;

wherein said at least one ceramic membrane filter element has a plurality of through openings and is electrically connected with only one electrical conductor extending through one of the through openings.

9. A filter device according to claim 8 further comprising an electrically conductive adhesive attaching the conductor onto the ceramic membrane filter element in the through opening.

10. A filter device according to claim 9 wherein the electrically conductive adhesive extends over essentially the entire face of the ceramic membrane filter element.

11. A filter device according to claim 9 wherein the electrically conductive adhesive extends partially into the through openings without the conductor.

* * * * *